United States Patent [19]  
Heinonen

[11] 4,022,560  
[45] May 10, 1977

[54] DRYING DEVICE
[76] Inventor: Russell M. Heinonen, 25 Temi Road, Hudson, Mass. 01749
[22] Filed: Dec. 29, 1975
[21] Appl. No.: 644,597
[52] U.S. Cl. .................................. 425/317; 34/46; 34/80; 34/90; 55/274; 425/242 R; 425/376 R
[51] Int. Cl.² ...................... B29B 3/04; F26B 21/04
[58] Field of Search ................... 34/46, 48, 80, 90; 55/274, 275, 387, 388; 425/86, 242 R, 317, 376 R

[56] References Cited  
UNITED STATES PATENTS 1,601,308 9/1926 Hill ........................................ 55/274
3,552,034 1/1971 May, Jr. ................................ 34/80

Primary Examiner—Robert G. Nilson
Attorney, Agent, or Firm—Frank A. Steinhilper; Alfred H. Rosen

[57] ABSTRACT

A dryer is disclosed, adapted for use mounted on a plastic mold, extruder or the like. A compact rectangularly shaped drying chamber hold a porous drying basket with free air space surrounding the base of the basket to provide quick drying. An air flow system includes a blower, a removable filter and a removable heater. The dryer includes a removable desiccant cartridge and means for signalling cartridge replacement.

2 Claims, 10 Drawing Figures

DRYING DEVICE

BACKGROUND OF THE INVENTION

In the plastics industries it is usual to use processes such as injection molding, extrusion and the like wherein a plastic material is fed into a mold, extruder or other equipment, is heated to soften the material, and pressed, drawn or forced into a desired shape. The plastic material employed in such processing is usually in the form of relatively small particles such as pellets or the like, or frequently in the form of reclaimed or reused plastic which has been obtained from a previous operation.

One of the problems confronting the industry is that the plastic material usually is moist with water, and this moisture interferes with uniformity of operating conditions or performance. At the present time the usual means of overcoming this problem is to heat the plastic material in a drying device, and then on demand take a quantity of the plastic and feed it to the plastic processing equipment. In most cases, and particularly where a number of molds or extruders operate on essentially the same type of plastic material, it is usually the custom to have a single relatively large drier or storage bin of dry plastic centrally located so that a charge of this plastic material can conveniently be placed in the hopper of any other of the various molds or extruders.

The central location of dryers or storage bins for plastic materials has a number of disadvantages. In the first place, when a charge of plastic material is carried across the shop it tends to pick a certain amount of moisture, particularly on a humid day. In the second place a centrally located dryer or bin is at best awkward when two different types of plastic are being used in two different plastic processing equipment. Furthermore, the centrally located operating dryer has, until now, heated appeared to have specific advantages in that a relatively large device economically justifies sophisticated control systems to assure a constant supply of material in constantly good condition.

When attempts have been made to use individual dryers near each mold or extruder the results have been unsatisfactory. At best, such individual dryers have been awkward and inconvenient, have not properly dried the product, or have created virtually as many problems as they have solved.

The solution to these problems has not been apparent, and at the present time such a centrally located dryer or bin is the normal operating procedure in most plastic plants.

GENERAL NATURE OF INVENTION

According to the present invention there is now provided an efficient, compact and effective low cost drying device removably mounted on a mold or extruder or other plastic processing equipment, to provide a constant supply of plastic material under uniform conditions. The plastic material is fed directly to the plastic processing equipment at controlled conditions of temperature and degree of moisture and contains material specifically intended for its own individual plastic equipment. The apparatus according to the present invention is simple and inexpensive and at the same time is automatic in its operation. All the operator need do is place a supply of either moist or dry plastic in a hopper of the feed device, set a single dial for desired operating controls, turn on the switch and then do whatever is a normally assigned task.

The apparatus includes a compact, rectangularly shaped chamber directly and removably mounted on the plastic processing equipment and positioned as a hopper for the equipment. A drying chamber in the dryer chamber acts as the hopper for plastic material for the principle machine. This drying chamber is positioned to direct a counter current of heated air through plastic material held in this drying chamber. In a selected location within the drying apparatus there is a cartridge or drawer of conventional desiccant material. A heating element and a blower or similar device act to recirculate hot air through the desiccant and through the drying chamber. A conveniently positioned control means, including a direct reading thermostatic switch, control the operation of the device in such a manner as to make supervision unnecessary in use and operation. An operator feeds a supply of plastic material through this equipment, optionally through an external hopper, then starts the device and sets it properly a single time, and goes about his business. The dryer automatically signals the need for adjustment or service, signals continued normal operation and signals the need for replacing the dessicant used in the dryer.

The nature of the invention is more fully disclosed in the accompanying drawings in which.

Figure 1:
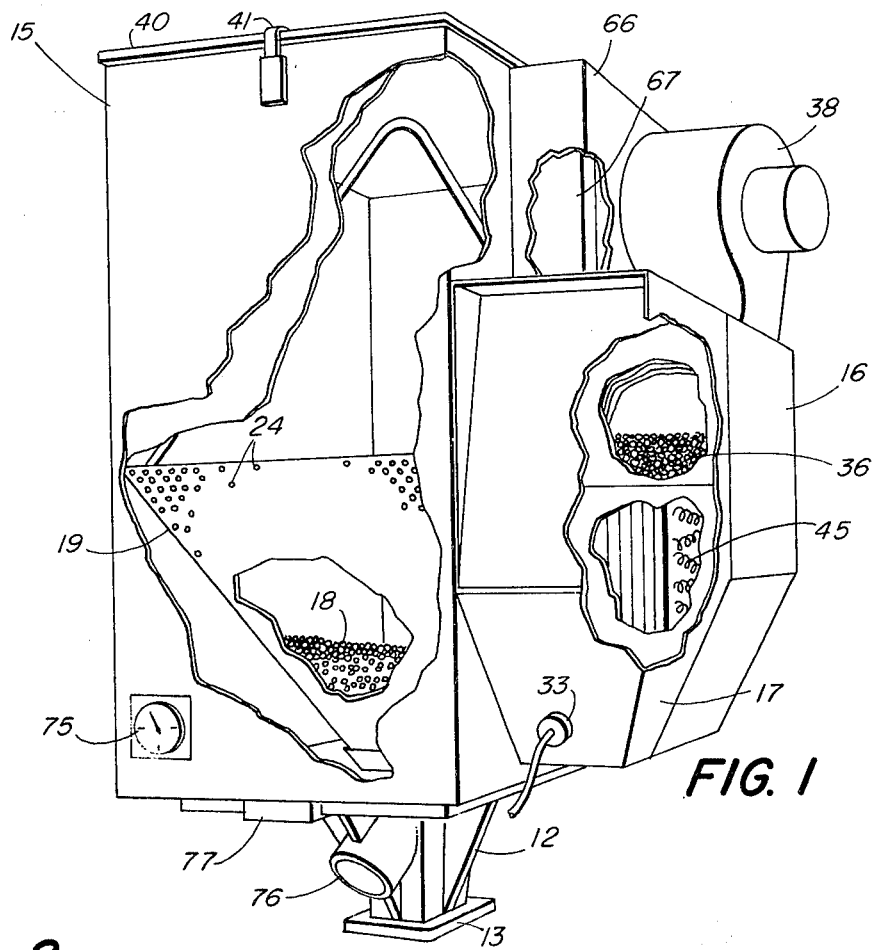
FIG. 1 is a perspective view, partially in section of a drying device to be mounted on a plastic processing equipment.
Figure 10:
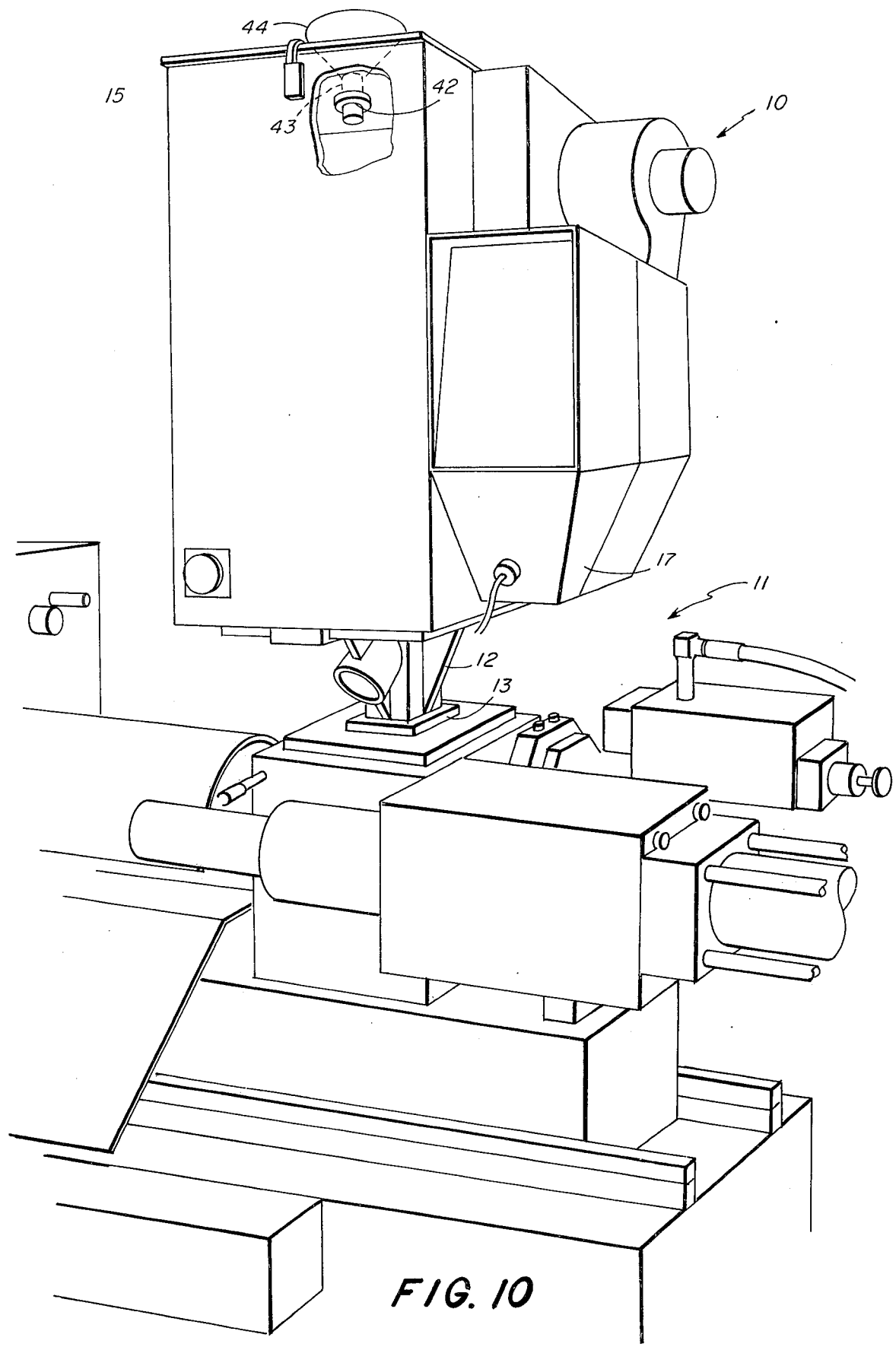
FIG. 10 is a perspective view, partially in section of a drying device shown mounted on plastic processing equipment.

In FIG. 1 in conjunction with FIG. 10 is shown a dryer generally designated 10 for plastic particles or granules mounted in fixed position directly on an extruder or mold 11, by means of mounting surface of the extruder is shown in the drawing. The dryer 10 has a rectangular main drying chamber 15 and mounted at one side thereof is a desiccant chamber 16 and an integrally joined control chamber 17, shown also in FIGS. 2 and 3. The dryer is mounted close to the mold or extruder and holds a large quantity of material with minimum intrusion into normal working space.

The mounting 12 which supports the dryer is secured to a mounting plate 13 which in turn is mounted on a mold or extruder. Desirably a drain 76 may be included in support 12. A plug placed in or removed from this drain 76 permits the contents of basket 19 to be drained out of the dryer. This is generally done, for example, at the end of a run. A slide or pull valve 77 is positioned to be opened for operation or drainage to permit plastic 18 to feed an extruder or mold or to feed or drain 76. Slide 77 is pulled to drain and pushed in to close the drain.

Figure 4:
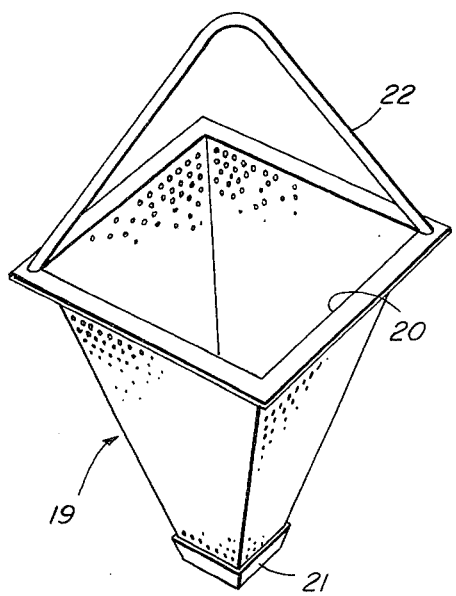
FIG. 4 is a perspective view of an insert component for the apparatus of FIG. 1.
Figure 5:
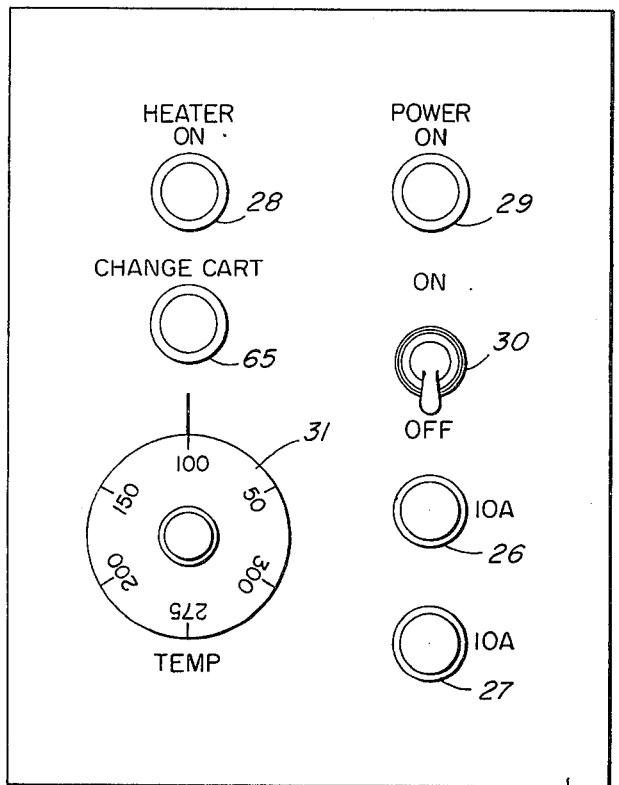
FIG. 5 is a view of a control panel for the apparatus of FIG. 1.

The main chamber forms a drying chamber in which is removably positioned a drying basket 19 adapted to hold a plastic material 18 and feed it on demand to the extruder 11. The basket is shown in greater detail in FIG. 4 and is shaped as a square funnel with a large square upper opening 20 for introduction of plastic material tapering down to a small lower discharge open end 21 or passage. Secured to the top of basket 19 is a positioning frame 22. The basket 19 and its frame 22 are shaped to fit within chamber 15 to engage the sides, top and bottom of the chamber and to secure the basket 19 in position. When the basket 19 is in position, there is free air space surrounding the basket; in particular there is a large free air space around the bottom of the basket where plastic is contained immediately prior to entering the extruder. When the entire assembly is dismounted for repair or service, the basket is held in position by positioning frame 22 and does not dislodge. The positioning frame 22 also acts as a handle for lifting basket 19 and for inserting it into chamber 15 and removing it therefrom. The basket 19 has a multiplicity of openings 24 in its side walls, generally characterized by being small enough to hold the plastic material placed therein and to let air circulate into and through the contents of the basket. In actual practice, holes of about ⅛ inch to ¼ inch are spaced on centers about twice the hole diameters. At the bottom of basket 19 is an exit fitting 21 adapted to fit a feed port (not shown) in the mold or extruder.

Figure 2:
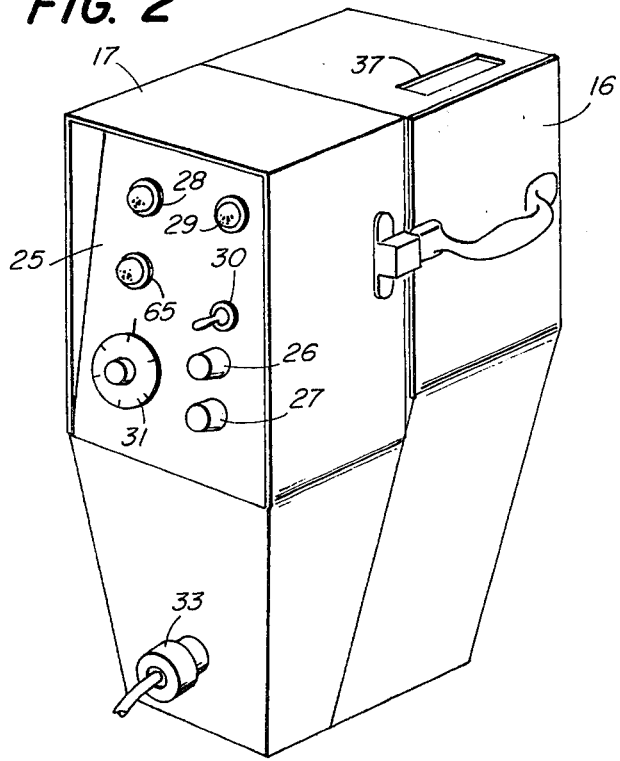
FIG. 2 is a perspective view of a portion of an apparatus of FIG. 1.
Figure 3:
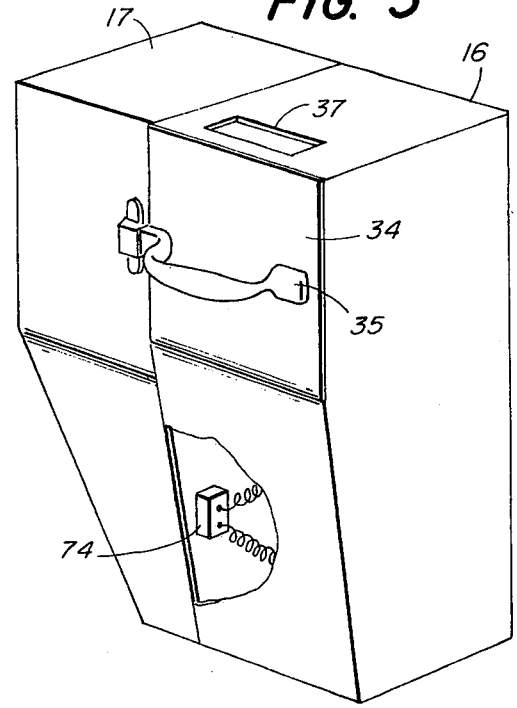
FIG. 3 is a perspective view from a different angle of the apparatus of FIG. 2.

Permanently fastened to one side of the chamber 15 are dessicant chamber 16 and control chamber 17. These chambers are optionally in the form of individual chambers for simplicity of manufacturing, although a single unit may be used if desired. As shown in FIG. 2, a control panel 25 on control chamber 17 has fuse receptacles 26 and 27, indicator lights 28 and 29, an off-on switch 30 and a control member such as a thermostatic control dial 31. As will be seen in connection with FIG. 6, indicator light 28 is a heater-on indicator, and light 29 is a power-on indicator. The control dial 31 is direct reading, being calibrated for temperature between 100° F and 300° F. A "change cartridge" signal 65 is further described in connection with FIG. 7. A power lead 33 is adapted to be connected to a suitable power supply optionally as an output connection of the extruder 11 or to a wall or floor electric outlet (not shown).

Figure 7:
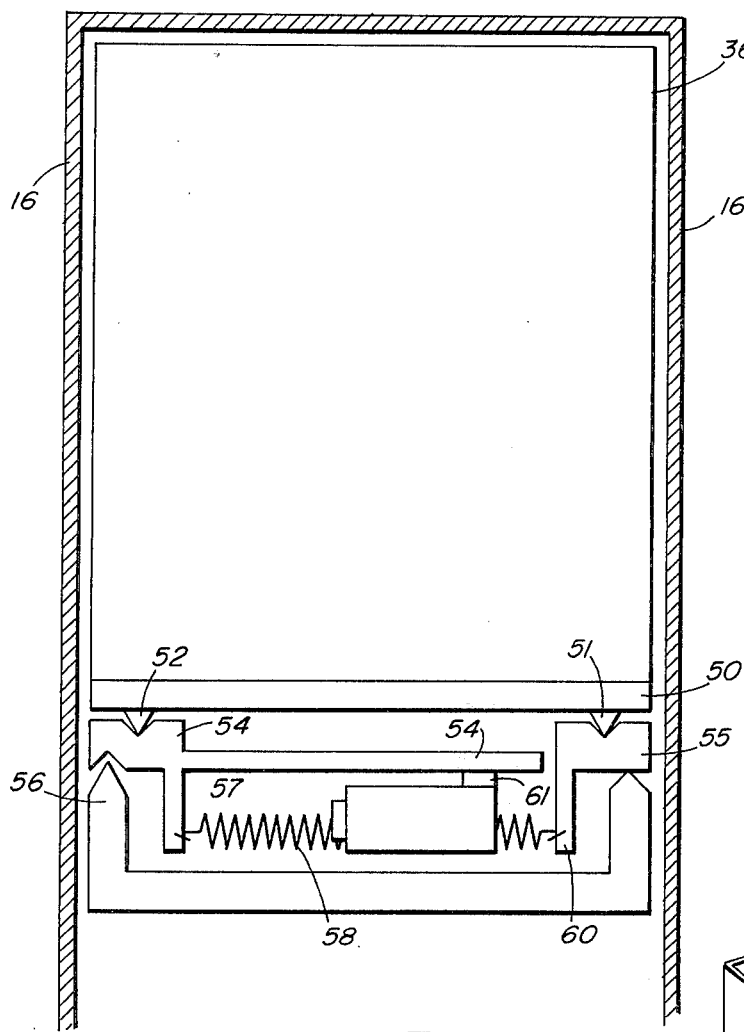
FIG. 7 is a side view, partially in section of desiccant control apparatus for the invention.

In the desiccant chamber 16 is a door 34 with a locking handle 35 positioned to close the chamber 16 against air leakage during operation and to permit easy access to a desiccant cartridge 36 (see FIG. 1 and FIG. 7). At the top of the desiccant chamber 16 is an opening 37 shaped to receive the port of a blower 38, the blower being mounted on main chamber 15 and communicating with both the main chamber 15 and the desiccant chamber 16, preferably operating in a direction to blow air out of main chamber 15 and down through desiccant chamber 16.

At the top of main chamber 15 is a door 40 with a catch 41 to hold it releasably in closed position. As shown in FIG. 10 a port 42 in door 40 receives the discharge nozzle 43 of a hopper 44 to permit feeding plastic material to the main chamber; if desired, door 40 may be opened for manual feed of the plastic.

Suitably mounted in the dryer is a heater 45, positioned in the path of air flow from main chamber 15 to blower 38. In one embodiment of the invention this heater 45 is a 1200 watt heater plugged into an electric outlet 74 below the desiccant cartridge 36. A thermometer 75 shows the temperature of operation.

Within desiccant chamber 16 is positioned a desiccant cartridge or drawer 36 slidably mounted on rails just inside door 34 for easy inspection and replacement. When the drying power of the desiccant is reduced or exhausted, the cartridge 36 is removed and replaced in a matter of seconds and is regenerated in a drying oven. Apparatus for determining and signalling cartridge replacement is shown in FIG. 7.

Figure 6:
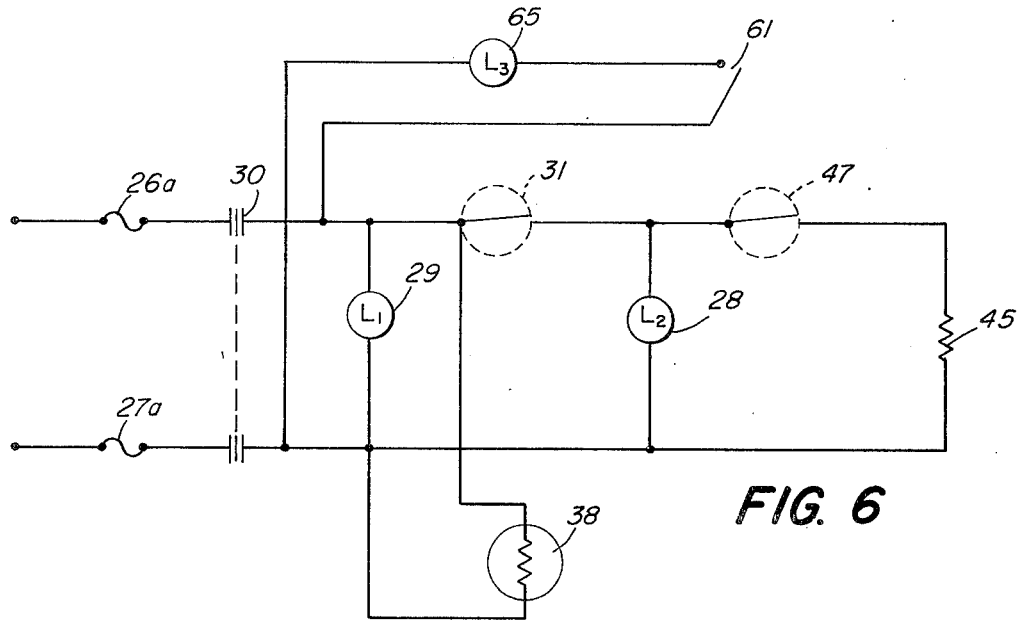
FIG. 6 is a schematic drawing of the power supply for the apparatus of FIG. 1.

The electrical power circuit shown in FIG. 6 connects through fuses 26a and 27a and off-on switch 30. The panel mounted thermostat 31 controls power to a heater 45 in conventional manner and a safety thermostatic switch 47 is set to open if excessive temperature is reached. A signal light 29, for example, a green light, signals when power is on, and a second signal light 47, for example, an amber light, signals while heater 45 is operating. Thus the operator can observe from a distance of the device is properly operating. The blower 38 operates as long as switch 30 is on, to blow air through the plastic during drying and to maintain air circulation in the event of overheating sufficient to open safety switch 47. A cartridge signal light L3 (designated 65) is shown in FIGS. 6 and 7 actuated by a microswitch 61.

In normal use and operation basket 19 is put in position, a fresh desiccant cartridge 36 is placed in desiccant chamber 16, thermostat 31 is set for the desired operating temperature, and a load of plastic material is fed to the device either manually or by means of hopper 44. The extruder 11, or other apparatus requiring a supply of plastic, is operated normally, Switch 30 is turned on, and a steady flow of dry plastic is assured. Air flows down through desiccant 36 from blower 38 across heater 45 into the bottom of main chamber 15 where it flows around the basket 19 and up through the basket to dry the plastic material therein. The air then is circulated [across heater 45] to leave the main chamber 15 and pass through blower 38 and back through the desiccant 36. For desiccant replacement a new cartridge is inserted through door 34 as needed. For repair or maintenance the entire assembly is easily removed from the extruder simply by unfastening mount 13, and the dryer can be tipped, inverted and otherwise moved without damage and without dislocation of parts.

In FIG. 7 is shown the dryer cartridge 36 positioned within chamber 16. The cartridge 36, also shown in FIG. 9, comprises a box-like cartridge enclosure open at the top and bottom. A handle 49 is mounted on the cartridge 36 to assist in placing it in or removing it from the drying chamber. The cartridge 36 rests on a platform 50 which in turn is supported by two wedge-shaped feet 51 and 52. These feet ride on a balance arm 54 and a pivot support 55, which in turn rest on pivot points 56. Balance arm 54 is rotationally movable around pivot point 56 in response to the weight of cartridge 36. A spring arm 57 projects downward from balance arm 54 and a spring 58 is secured to spring arm 57. The opposite end of the spring 58 is secured to a spring holder 60 attached to pivot support 55. An adjustment knob (not shown) can be turned to increase or reduce the tension of spring 58. The free end of balance arm 54 is movable downward to bear on a micro switch 61, and spring 58 is adjustably tensioned to select the cartridge weight required to operated switch 61.

Figure 9:
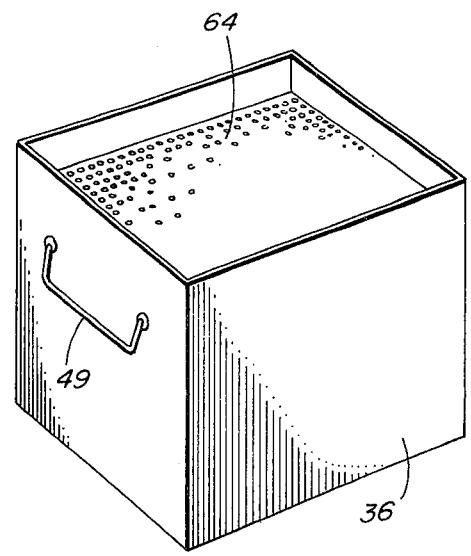
FIG. 9 is a perspective view of a desiccant cartridge according to one embodiment thereof.

Within the cartridge 36 are upper and lower screen members 64. The upper screen 64 is shown in FIG. 9 and the lower screen member 64 is not shown but is similarly mounted in cartridge 36. Within the cartridge 36 is a suitable conventional desiccant. Blower 38 is mounted above chamber 16 with its exit port extending into a slot 37 so as to deliver air from the blower into and through the desiccant cartridge 36.

As can be seen from FIG. 7 the cartridge 36 is positioned on its support members in such a way that if the cartridge gains a preselected weight of moisture it will move balance arm 54 downward to contact the micro switch 61. In use and operation, spring 58 is so tensioned that it supports the weight of a fresh cartridge 36 and as the cartridge gains about ½ pound in weight the balance arm 54 is displaced to contact micro switch 61.

Figure 8:
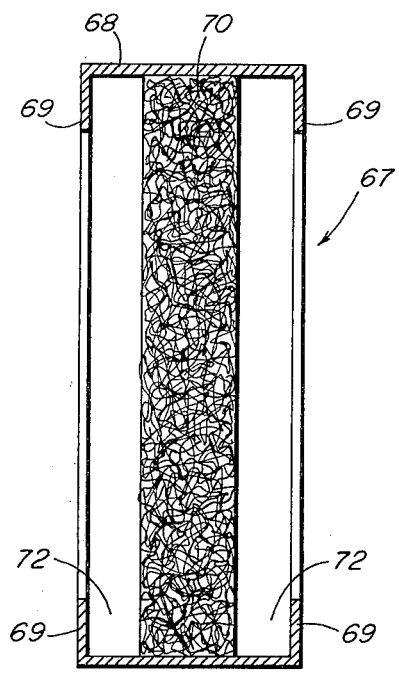
FIG. 8 is a front cross section of a filter for the dryer.

Within the dryer system and illustrated in FIG. 1 at a position between dryer chamber 15 and blower 38 is a filter chamber 66 in which is positioned a removable filter 67 (see also FIG. 8). The filter 67 comprises an outer frame 68, generally rectangular in shape and having open sides, whose openings permits air passage from the dryer chamber 15 through filter 67 to blower 38. Positioned within the frame is a filter element 70, which may be a loose fibrous filter pad adapted to filter solid particles out of an air stream. At the base of the filter, sidewalls 69 form traps 72 on each side of filter element 70 to catch and retain any solid particles which may drop off the filter element 70. Filter 67 is removable for inspection or replacement, and when it is removed the accumulated particles are contained in traps 72. When the dryer is operating air circulates around and underneath basket 19 and thereafter passes inside basket 19 to contact the plastic material 18 contained therein. When the apparatus is first turned on hot dry air quickly floods the drying chamber below the basket and then dries the plastic material 18, thus avoiding long warm-up times. Thermometer 75 at the base of chamber 15 accordingly reads directly the temperature within the working space at the base of chamber 15 and tells the operating temperature at the point where plastic is about to enter the extruder.

When the desiccant cartridge extracts a desired weight of moisture from the air, it operates signal 65. Thereupon, the operator removes cartridge 36 from the desiccant chamber and replaces it with another cartridge 36. The original cartridge is then placed in a regenerator which passes dry air through the cartridge at a hotter temperature to remove moisture and prepare the cartridge for a subsequent cycle of use.

I claim:

1. A dryer for plastic material to be mounted on plastic shaping apparatus such an an extruder, mold or the like, comprising a self contained assembly having:
   a drying chamber of rectangular cross sectional shape positioned against the plastic shaping apparatus,
   a desiccant chamber of rectangular cross sectional shape positioned beside the drying chamber having within said rectangular shape parallel and confronting screens located above and below a desiccant agent through which air is caused to flow,
   a porous basket of rectangular cross sectional shape positioned in the drying chamber, said basket tapering from a larger upper end substantially filling the cross sectional area of the drying chamber to a smaller lower end to provide a free air space surrounding the lower end of the basket,
   means to direct plastic material from the bottom of said basket to the plastic shaping apparatus,
   said desiccant agent in said desiccant chamber to remove moisture from air passing therethrough,
   a blower positioned to convey air in a closed path through the drying chamber, the basket, and the desiccant chamber,
   heating means located in said closed path to heat said air,
   air filter means located in said closed path to remove particulate matter from said air, and
   thermostatic control means controlling said heating means to maintain said air at a preset temperature when said dryer is operating.

2. A dryer according to claim 1, wherein said drying means comprises a desiccant cartridge of measured weight and means in said desiccant chamber responsive to increased weight of predetermined amount to electrically signal said predetermined increase in weight.

* * * * *